US012406510B2

(12) United States Patent
Tu et al.

(10) Patent No.: US 12,406,510 B2
(45) Date of Patent: Sep. 2, 2025

(54) METHOD FOR THE DETECTION, SEGMENTATION AND MORPHOLOGICAL MAPPING ON NEURAL CELL IMAGES OF THE WHOLE BRAIN

(71) Applicant: HOWARD UNIVERSITY, Washington, DC (US)

(72) Inventors: Tsang-Wei Tu, Rockville, MD (US); Yi-Yu Hsu, Rockville, MD (US); Chao-Hsiung Hsu, College Park, MD (US); Artur Agaronyan, College Park, MD (US); Paul C. Wang, Rockville, MD (US)

(73) Assignee: Howard University, Washington, DC (US)

( * ) Notice: Subject to any disclaimer, the term of this patent is extended or adjusted under 35 U.S.C. 154(b) by 526 days.

(21) Appl. No.: 17/706,252

(22) Filed: Mar. 28, 2022

(65) Prior Publication Data

US 2022/0309810 A1    Sep. 29, 2022

Related U.S. Application Data

(60) Provisional application No. 63/166,953, filed on Mar. 26, 2021.

(51) Int. Cl.
| | | |
|---|---|---|
| *G06T 5/92* | (2024.01) |
| *G06T 7/00* | (2017.01) |
| *G06T 7/11* | (2017.01) |
| *G06T 7/149* | (2017.01) |
| *G06T 7/194* | (2017.01) |
| *G06V 20/69* | (2022.01) |

(52) U.S. Cl.
CPC ............. *G06V 20/695* (2022.01); *G06T 5/92* (2024.01); *G06T 7/0012* (2013.01); *G06T 7/149* (2017.01); *G06T 7/194* (2017.01); *G06T 2207/20084* (2013.01); *G06T 2207/30016* (2013.01)

(58) Field of Classification Search
None
See application file for complete search history.

(56) References Cited

U.S. PATENT DOCUMENTS

| | | | | |
|---|---|---|---|---|
| 2005/0244421 A1* | 11/2005 | Strittmatter | .......... | G01N 33/574 |
| | | | | 424/192.1 |
| 2009/0137662 A1* | 5/2009 | Gordon | .................. | A61K 45/06 |
| | | | | 506/14 |
| 2012/0328526 A1* | 12/2012 | Kristian | .................. | A61P 25/02 |
| | | | | 514/17.7 |

(Continued)

FOREIGN PATENT DOCUMENTS

| | | | | | |
|---|---|---|---|---|---|
| CN | 111524138 | * | 8/2020 | ............... | G06K 9/00 |
| EP | 3699810 | * | 8/2020 | ............... | G06K 9/00 |

*Primary Examiner* — Beniyam Menberu
(74) *Attorney, Agent, or Firm* — Sughrue Mion, PLLC

(57) ABSTRACT

A method and apparatus for morphological analysis of neural cells may include receiving an immunohistochemistry (IHC) image of one or more neural cells; detecting the one or more neural cells in the IHC image using a first neural network, wherein the detecting includes identifying boundaries of the one or more neural cells; generating a segmentation cell mask using a second neural network based on the identified boundaries of the one or more neural cells; and classifying the one or more neural cells based on the generated segmentation cell mask using a trained classification model.

16 Claims, 6 Drawing Sheets

(56) References Cited

U.S. PATENT DOCUMENTS

| | | | |
|---|---|---|---|
| 2017/0306046 A1* | 10/2017 | daSilva | A61P 31/20 |
| 2018/0346875 A1* | 12/2018 | Qi | A61K 35/30 |
| 2020/0193608 A1* | 6/2020 | Sato | G06V 20/46 |
| 2021/0117729 A1* | 4/2021 | Bharti | G06V 10/82 |
| 2022/0020142 A1* | 1/2022 | Anderson | G06N 3/084 |
| 2022/0233695 A1* | 7/2022 | Yoo | A61M 37/0092 |
| 2023/0221239 A1* | 7/2023 | Praljak | G06V 10/82 |
| | | | 382/134 |

* cited by examiner

METHOD FOR THE DETECTION, SEGMENTATION AND MORPHOLOGICAL MAPPING ON NEURAL CELL IMAGES OF THE WHOLE BRAIN

CROSS-REFERENCE TO RELATED APPLICATION(S)

The present disclosure claims the benefit of U.S. Provisional Patent Application No. 63/166,953, filed on Mar. 26, 2021, the disclosure of which is incorporated herein in its entirety by reference.

BACKGROUND

This disclosure relates generally to field of data processing, and more particularly to deep learning.

Microglia and astrocytes are a specialized population of neuroglial cells that are found in the central nervous system. Microglia and astrocytes facilitate the development and health of the brain and spinal cord. These cells are important for immune surveillance and support of normal neurological function in the central nervous system. Microglia are the first responding cells to injuries or diseases within the central nervous system and help to remove damaged neurons and infections. Astrocytes are dynamic neuroglial cells that are responsible for the support and defense of the central nervous system, including the formation of the blood-brain barrier, regulation of cerebral blood flow, nutrition supplies, and maintenance of ion balance. Microglial and astroglial cells are critical in the repair process of the brain and spinal cord following infections, diseases and traumatic injuries. The morphotypes of these neuroglial cells are notably diverse, and their roles in brain development, function and injury repair are still not well understood. Current morphological analysis for microglia and astrocytes relies on either manual tracing of cells, or by the rule-based methods, such as image intensity threshold or projection analysis, on the histological images.

SUMMARY

Embodiments relate to a method, system, and computer readable medium for morphological analysis of cells. According to one aspect, a method for morphological analysis of cells is provided.

According to an embodiment of the present disclosure, a computer system for morphological analysis of cells is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method.

According to an embodiment of the present disclosure, a method for morphological analysis of neural cells may be provided. The method executed by one or more processors and may include receiving an immunohistochemistry (IHC) image of one or more neural cells; detecting the one or more neural cells in the IHC image using a first neural network, wherein the detecting includes identifying boundaries of the one or more neural cells; generating a segmentation cell mask using a second neural network based on the identified boundaries of the one or more neural cells; and classifying the one or more neural cells based on the generated segmentation cell mask using a trained classification model.

The method may further include reconstructing a cell mapping based on cell location of the one or more neural cells, activation classes of the one or more neural cells, morphology of the one or more neural cells, and morphometric parameters of the one or more neural cells.

According to some embodiments, the first neural network and the second neural network are trained on a same training data and rule-based ground truths.

According to some embodiments, prior to the detecting the one or more neural cells in the IHC image, the IHC image may be preprocessed, and the preprocessing may include removing a background from the IHC image; converting the IHC image into a grayscale image, wherein the converting includes intensity inversion to reduce influence of color tones in the morphological analysis; and dividing the converted IHC image into a plurality of patches.

According to some embodiments, the detecting the one or more neural cells using the first neural network may include identifying one or more signature features of a neural cell from a plurality of patches; based on identifying the one or more signature features, generating a bounding box enclosing the neural cell; and extending the bounding box enclosing the neural cell to cover a cell body of the neural cell and to cover extending processes of the neural cell.

According to some embodiments, the generating the segmentation cell mask may include receiving an extended bounding box enclosing the neural cell; receiving a cell location for the neural cell, the cell location including a unique identification associated with a patch from the plurality of patches where the extended bounding box is located and corresponding coordinates of the patch; and generating the segmentation cell mask based on the extended bounding box and the received cell location.

According to some embodiments, the generating the segmentation cell mask may further include aligning the generated segmentation cell mask with the neural cell based on the cell location or the one or more signature features.

According to some embodiments, the classifying may include identifying activation classes for the one or more neural cells.

According to some embodiments, the IHC image may include a full brain image that includes the one or more neural cells.

According to some embodiments, the morphometric parameters may include at least one of pixel intensity, intensity ratio between soma and processes, or soma shape change parameters.

According to some embodiments, the one or more neural cells may include microglia, and the classifying the one or more neural cells may include classifying the one or more neural cells into a cell type, wherein the cell type is one of ramified, hypertrophic, bushy, ameboid, rod, or hyper-rod cell type.

According to some embodiments, the one or more neural cells may include astroglia, and the classifying the one or more neural cells may include classifying the one or more neural cells into a cell type based on a localization of the one or more neural cells and a reactivity of the one or more neural cells.

According to an embodiment of the present disclosure, an apparatus may be provided. The apparatus may include at least one memory configured to store program code; and at least one processor configured to read the program code and operate as instructed by the program code. The program code may include first receiving code configured to cause the at least one processor to receive an immunohistochemistry (IHC) image of one or more neural cells; first detecting code configured to cause the at least one processor to detect the one or more neural cells in the IHC image using a first neural network, wherein the detecting includes identifying boundaries of the one or more neural cells; first generating code configured to cause the at least one processor to generate a segmentation cell mask using a second neural network based on the identified boundaries of the one or more neural cells; and first classifying code configured to cause the at least one processor to classify the one or more neural cells based on the generated segmentation cell mask using a trained classification model.

According to an embodiment of the present disclosure, a non-transitory computer-readable medium storing instructions may be provided. The instructions, when executed by at least one processor, may cause the at least one processor to receive an immunohistochemistry (IHC) image of one or more neural cells; detect the one or more neural cells in the IHC image using a first neural network, wherein the detecting includes identifying boundaries of the one or more neural cells; generate a segmentation cell mask using a second neural network based on the identified boundaries of the one or more neural cells; and classify the one or more neural cells based on the generated segmentation cell mask using a trained classification model.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
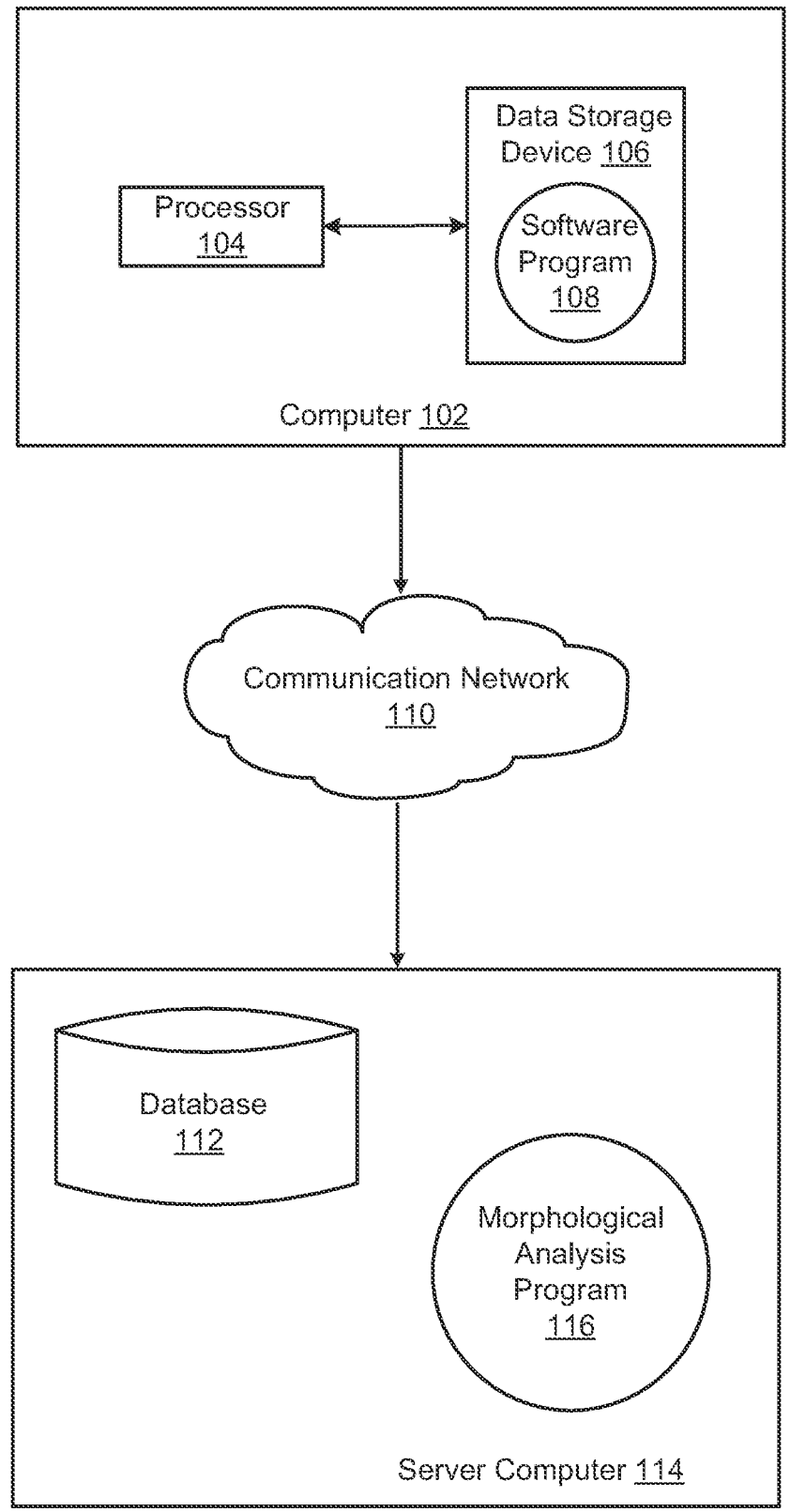
FIG. 1 illustrates a networked computer environment according to at least one embodiment.

Detailed embodiments of the structures and methods are disclosed herein; however, it can be understood that the disclosed embodiments are merely illustrative of the structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to machine learning. The following described exemplary embodiments provide a system, method and computer program to, among other things, learn the morphological patterns and features of highly variable cells of microglia and astrocytes. Therefore, some embodiments have the capacity to improve the field of computing by allowing for automation of the quantification of histological images.

As previously described, microglia and astrocytes are a specialized population of neuroglial cells that are found in the central nervous system. Microglia and astrocytes facilitate the development and health of the brain and spinal cord. These cells are important for immune surveillance and support of normal neurological function in the central nervous system. Microglia are the first responding cells to injuries or disease within the central nervous system and help to remove damaged neurons and infections. Astrocytes are dynamic neuroglial cells that are responsible for the support and defense of the central nervous system, including the formation of the blood-brain barrier, regulation of cerebral blood flow, nutrition supplies, maintenance of ion balance. Microglial and astroglial cells are critical in the repair process of the brain and spinal cord following infections, diseases and traumatic injuries. The morphotypes of these neuroglial cells are notably diverse, and their roles in brain development, function and injury repair are still not well understood. Current morphological analysis for microglia and astrocytes relies on either manual tracing of cells, or by the rule-based methods, such as image intensity threshold or projection analysis, on the immunohistochemistry (IHC) staining images.

However, in IHC staining of these neuroglial cells, it may be difficult to count cell numbers. The threshold for an area count may be problematic when excessive background or scanning artifacts appear. Moreover, it may be difficult to quantify cell morphology and only obtain a qualitative description. Additionally, current analysis techniques may be laborious and subject to bias. It may be advantageous to automate the quantification of cell morphotypes, such as in patients presenting with infections, diseases and traumatic brain injuries.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The following described exemplary embodiments provide a system, method and computer program that applies the deep learning model for cell detection and segmentation to categorize the cell morphology in the commonly used 2D, 20× (or higher magnification) immunohistochemistry (IHC) images. The embodiments disclosed herein may specifically detect targeted cells (e.g., microglia, astrocyte), including cell detection, segmentation and morphological classification, which are disorderly patterned and evolved in the normal tissue and/or in diseased condition. Exemplary embodiments described herein capture the morphological features of neuroglial activation of the entire brain and reduce the time consuming efforts in cell counting of the IHC images to study different brain injury and diseases. Exemplary embodiments described herein may be utilized to analyze the inflammatory response in a rat model of neonatal cardiac arrest. Embodiments of the present disclosure show improved capture of regional and injury-specific morphological phenotypes of neuroglia after cardiac arrest hypoxia.

Referring now to FIG. 1, a functional block diagram of a networked computer environment illustrating a morphological analysis system 100 (hereinafter "system") for analyzing morphologies of cells. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for morphological analysis of microglial and astroglial cells is enabled to run a Morphological Analysis Program 116 (hereinafter "program") that may interact with a database 112. The Morphological Analysis Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger morphological analysis program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
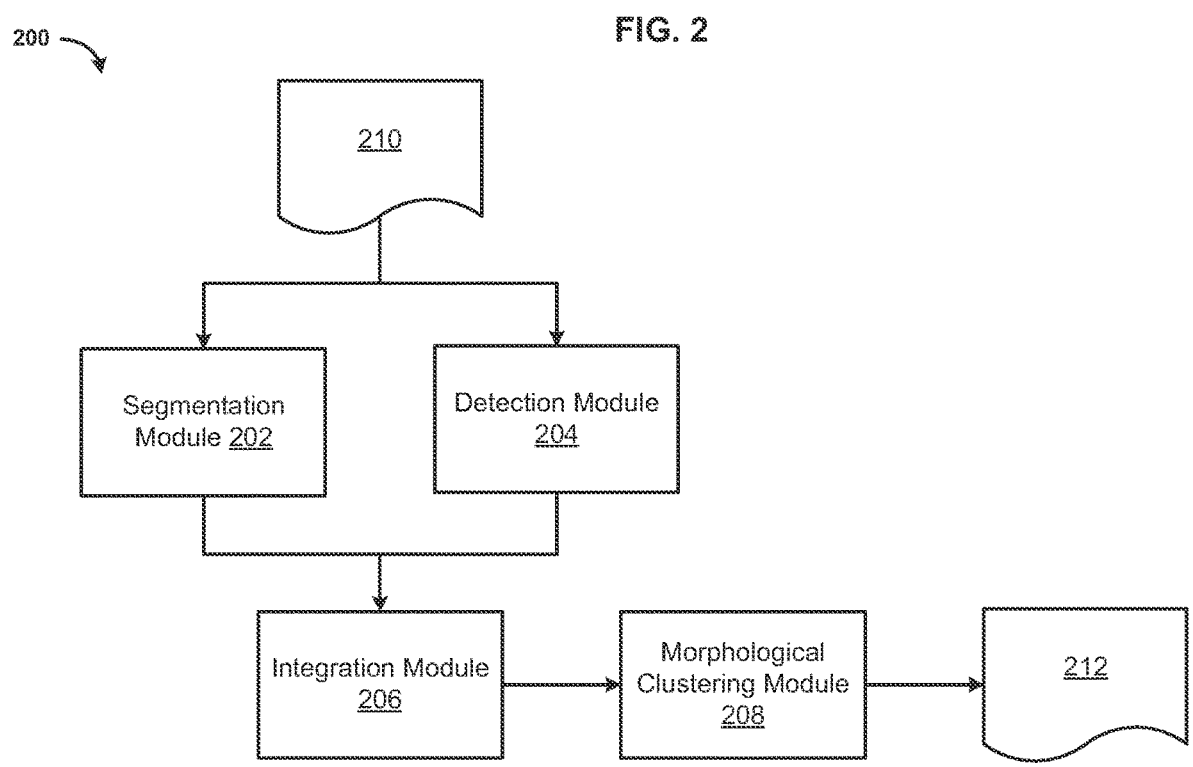
FIG. 2 is a block diagram of a system for cell detection, segmentation and morphological analysis according to at least one embodiment.

Referring now to FIG. 2, a block diagram of a morphological analysis system is depicted. The morphological analysis system may include, among other things, a segmentation module 202, a detection module 204, an integration module 206, and a morphological clustering module 208.

Input data 210 may be a piece of IHC image data of neuroglial or a plurality of neural cells, or a full scale of image obtained of the entire brain, regardless of the image size. The detection module 204 may be, for example, a convolutional neural network object detection model (e.g. YOLO, YOLACT, Detectron2) that may receive the input data 210. In some embodiments, the object detection model may include but not be limited to pre-processing such as removing the background from the IHC image and converting the IHC image into grayscale with intensity reversed to avoid the influence of different color tones. In some embodiments, the object detection model may also include dividing the IHC image into a series of 512×512 image patches or 256×256 image patches. The pre-processed IHC image patches may be received by the detection module 204 for recognizing the signature features of a neural cell, including neural cell body and processes. The detection module 204 may generate a bounding box enclosing the neural cell based on identifying the one or more signature features. The detection module 204 may According to some embodiments, the detection module 204 may include a convolutional neural network to predict bounding boxes of neuroglia or neural cells with probabilities calculated for each of a plurality of box classes. Detecting a neural cell in the pre-processed IHC image or patches, the detection module 204 may generate bounding box will enclose the cell in a size covering the majority of cell area. In some embodiments, a bounding box may contain only one cell.

The segmentation module 202 may be, for example, a mask region-based convolutional neural network (e.g. U-net, Mask-RCNN architecture) that may also receive input data 210 and create a mask segmentation according to one or more cell features. The segmentation module 202 may detect one or more features present within the input data 210 or the detection data produced by the detection module 204.

A segmentation classifier in the segmentation module 202 may receive cell detection results for extracting the morphology features of cell and predicting the borders of each cell that distinguish a single cell from other contrast and background in the bounding box. In some embodiments, the segmentation module 202 may include an inductive transfer scheme that may provide the results of the detection module 204 to the segmentation module 202 as an additional feature to the mask region-based convolutional neural network. In some embodiments, the segmentation module 202 may include cropping or expanding a field of view around the initial bounding box to include sufficient area encompassing glial cell body and the extending processes. The cropped or expanded patches may be labelled with a unique identification number and the corresponding coordination may be recorded. As an example, the field of view around the initial bounding box may be cropped or expanded into patches sized 256×256.

In some embodiments, the segmentation module 202 may receive the bounding boxes from the detection module 204. The segmentation module 202 may generate an extended or cropped bounding box enclosing the cell to cover a cell body of the cell and to cover extending processes of the cell. In some embodiments, the extended or cropped bounding box enclosing the cell may be patches of 256×256 size. The segmentation module 202 may receive a cell location for the cell, the cell location including a unique identification associated with a patch from the plurality of patches where the extended bounding box is located and corresponding coordinates of the patch from the detection module 204. In some embodiments the segmentation module 202 may generate a segmentation cell mask based on the extended bounding box and the received cell location. The segmentation module 202 may also align the generated segmentation cell mask with the neural cell based on the cell location or the one or more signature features.

The neural networks included in the segmentation module 202 or the detection module 204 may be trained on a same training data and rule-based ground truths. In some embodiments, the training data may be preprocessed in a same manner as described in the present disclosure. The models in the neural networks being trained may be evaluated and verified using rule-based ground truth. In some embodiments, the evaluation or verification may be manual.

Composite scheme such as the one described herein may combine a plurality of deep learning techniques and achieve increased model accuracy, stability and reproducibility. As an example, an ultrafast convolutional network, for example, YOLO, may be combined with a U-Net classifier to generate different cell maps from more than 48 morphometric parameters that can be used to depict the morphology of the glial cells.

The integration module 206 may combine the segmented data with the detected feature data that composite both counting and segmentation masks on the entire IHC image. The morphological clustering module 208 may include convolutional neural network, support vector machine, decision tree and hierarchical clustering to classify morphologies of the cells, such as ramified, hypertrophic, bushy, and amoeboid, rod-like, and hypertrophic rod-like morphotypes. The morphological clustering module 208 may receive the results of the segmentation module 202 or the one or more composite schemes and may identify the activation classes for glial morphotypes. The morphological clustering module 208 may also output data 212 that may correspond to, among other things, a full-scale quantitative morphological atlas labeling the locations of cells and their morphotype categorization based on the identified features. As an example, the morphological clustering module 208 may include a classification task that categorizes different cell types by analyzing the morphometric parameters using suitable classification algorithms, for example, C50 Decision Tree algorithm. In some embodiments, the morphometric parameters may include at least one of pixel intensity, intensity ratio between soma and processes, or soma shape change parameters.

In some embodiments, the morphological clustering module 208 may include cell mapping. Cell mapping may include cells being reconstructed with color-coded activation classes, morphology, morphometric parameters, cell distances etc., and stored and/or displayed, Cell mapping may include morphotype mapping, morphometric parameter, and 2D and 3D distribution. A mask may be marked for each cell and merged back to the original IHC image for cell mapping in 2D or 3D. The 3D cell distribution maps may be created by interpreting the data points between the 2D slides after calculating the local cell density in each 512×512 pixel area (0.12 $mm^2$) and converted into the unit per $mm^2$.

According to embodiments of the present disclosure, after detection and segmentation of the IHC image or as a part of segmentation, each cell mask may be positioned in the coordinate of the original image according to the ID given to the mask area. As an example, masks with an intersection over union (IoU) threshold above 0.7 may be considered as the same cell. When the IoU of two masks may be less than 0.7, the largest area in each non-overlap region may be obtained and then the overlapped fragments may be allocated to the non-overlap component with the shorter distance. In embodiments when the shortest distance between the fragment and continents may be the same, the distance from the fragment to the center of the convex hull of each continent may be compared and then the distance from the fragment to the maximum intensity point in the continents may be compared to assign the attached fragment.

According to embodiments of the present disclosure, morphological analysis systems such as described herein, may improve the extraction of the critical features between glial processes and cell body to depict the radial, spiky features of neuroglia. The "tree-like" morphology of the neuroglial cells may be a very important determinant when a neuropathologist quantifies and categorizes the status of the glial cells in a normal or pathological status. In addition to the radial and spiky features, according to embodiments of the present disclosure may quantify not only cell numbers, but also the activation phenotypes based on the learned neural networks and ground truth microscopic image database pre-defined by neuropathologists. Because the morphological quantification may be done through pattern recognition of the notable glial features, morphological analysis systems and methods described herein may overcome the limitation of staining artifacts (e.g., uneven background, photo features, bleaching etc.) and may perform unbiased cell quantification. According to embodiments of the present disclosure, the above-mentioned methods, processes, and modules may be used for comprehensive classification of the glial cells across different brain regions or the quantification of cell morphology over a whole brain section. In some embodiments, microglia may be classified into six categories, for example, ramified, hypertrophic, bushy, ameboid, rod, and hyper-rod, to cover the morphology from surveillant state to activated state, from gray matter to white matter regions. In some embodiments, astroglia may be classified based on a localization of the one or more cells and a reactivity of the one or more cells.

Figure 3:
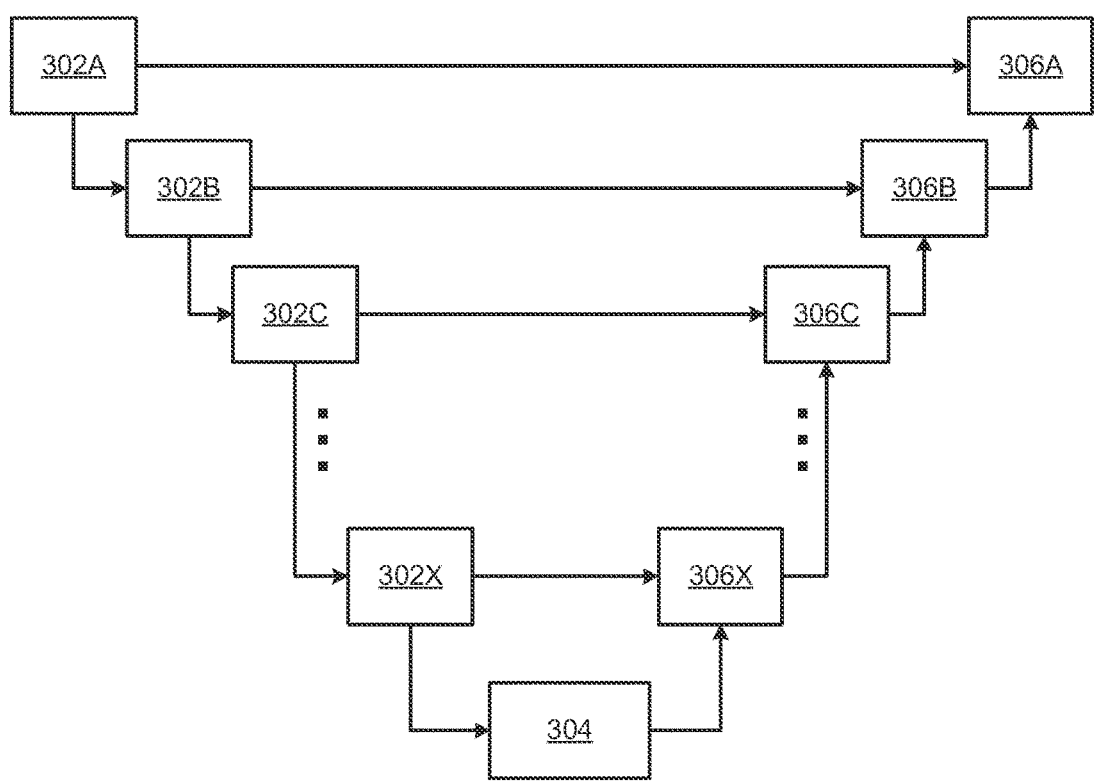
FIG. 3 is a block diagram of a U-net architecture for morphological analysis, according to at least one embodiment.

Referring now to FIG. 3, a block diagram of a U-net architecture 300 for cell segmentation is depicted. The U-net architecture 300 may include, among other things, one or more input nodes 302A-302X, one or more output nodes 304A-304X, and a latent space 306. The input nodes 302A-302X may form a contraction path for feature extraction, while the output nodes 304A-304X may form an expansive path for detail preservation. The input nodes 302A-302X and the output nodes 304A-304X may each include one or more convolution kernels (e.g., 3×3 convolution kernel) and rectified linear units. Each of the input nodes 302A-302X may be successively connected by a max pooling layer (e.g., 2×2 max pooling layer). The output nodes 304A-304X may successively feed into one another in a reverse order by an up-sampling connection (e.g., up-sampling factor of 2). The final output node, output node 304A, may output the morphological data.

Figure 4:
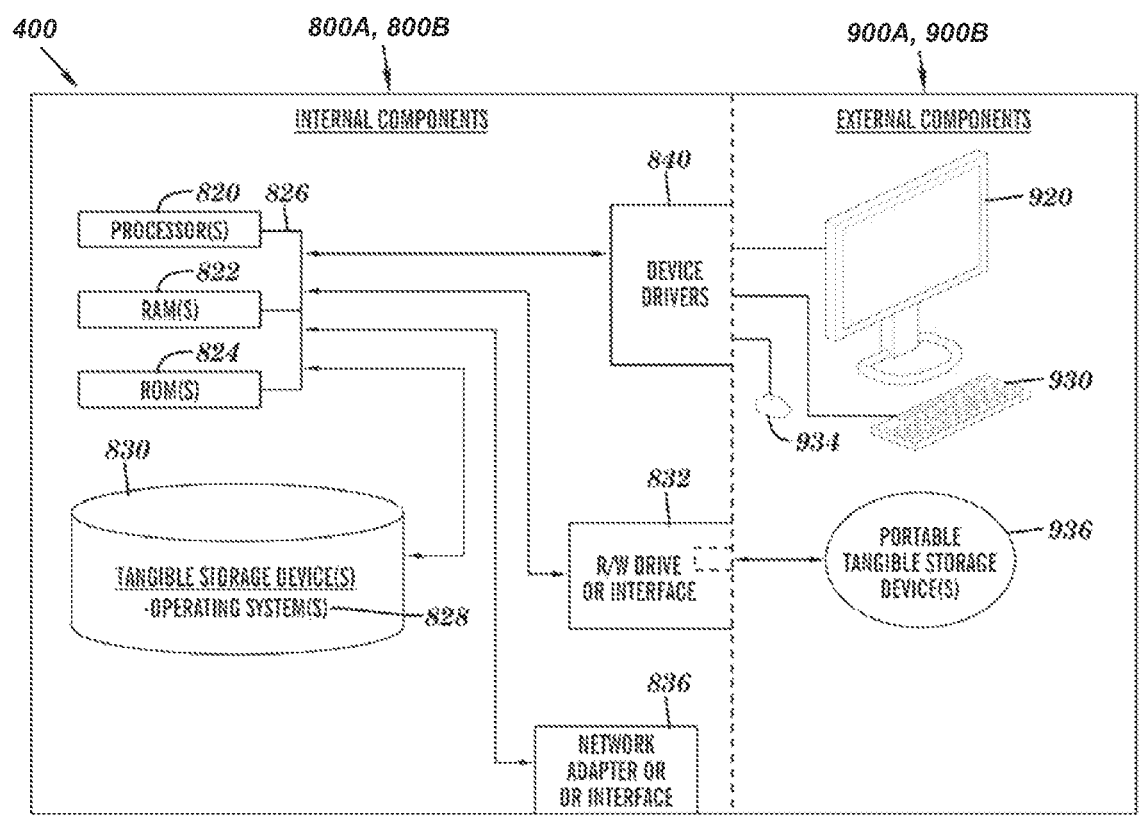
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Figure 5:
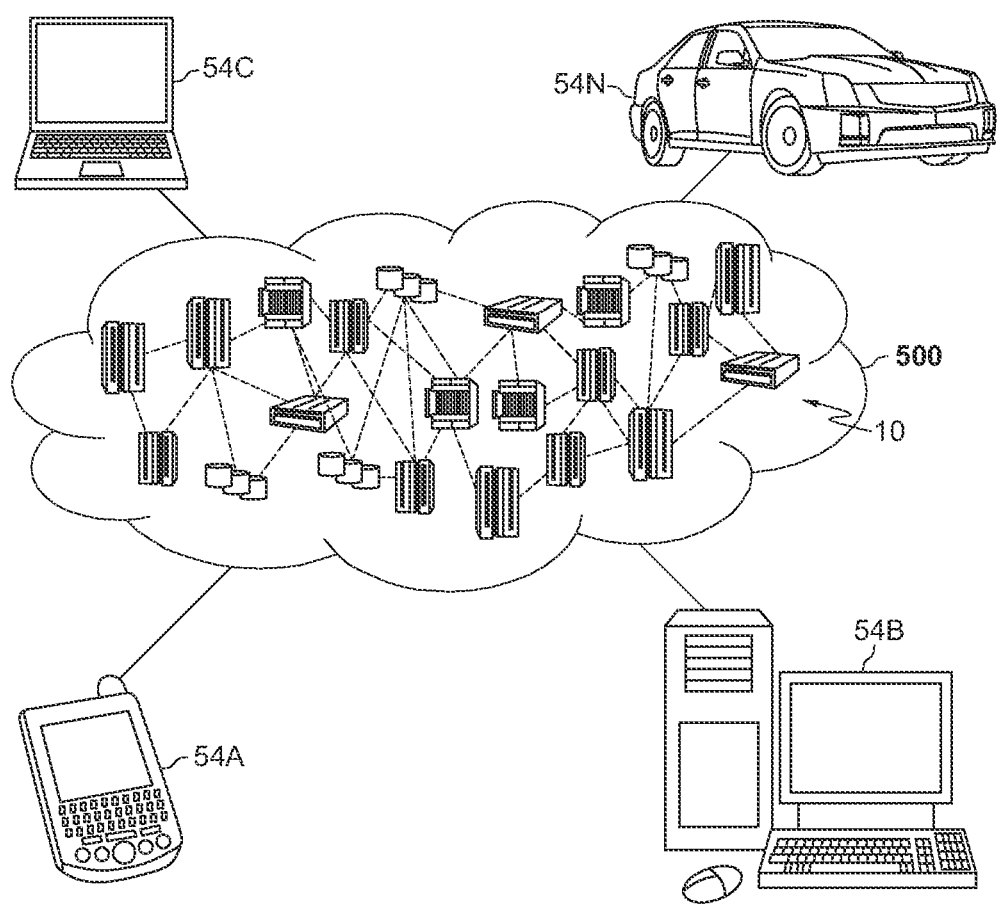
FIG. 5 is a block diagram of an illustrative cloud computing environment including the computer system depicted in FIG. 1, according to at least one embodiment.

Computer 102 (FIG. 1) and server computer 114 (FIG. 1) may include respective sets of internal components 800A,B and external components 900A,B illustrated in FIG. 5. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 may include one or more processors capable of being programmed to perform a function. Bus 826 may include a component that permits communication among the internal components 800A,B.

The one or more operating systems 828, the software program 108 (FIG. 1) and the Morphological Analysis Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B may also include a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Morphological Analysis Program 116 (FIG. 1) can be stored on one or more of the respective portable computer-readable tangible storage devices 936, read via the respective R/W drive or interface 832 and loaded into the respective hard drive 830.

Each set of internal components 800A,B may include network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Morphological Analysis Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Morphological Analysis Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B may include device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure may include a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
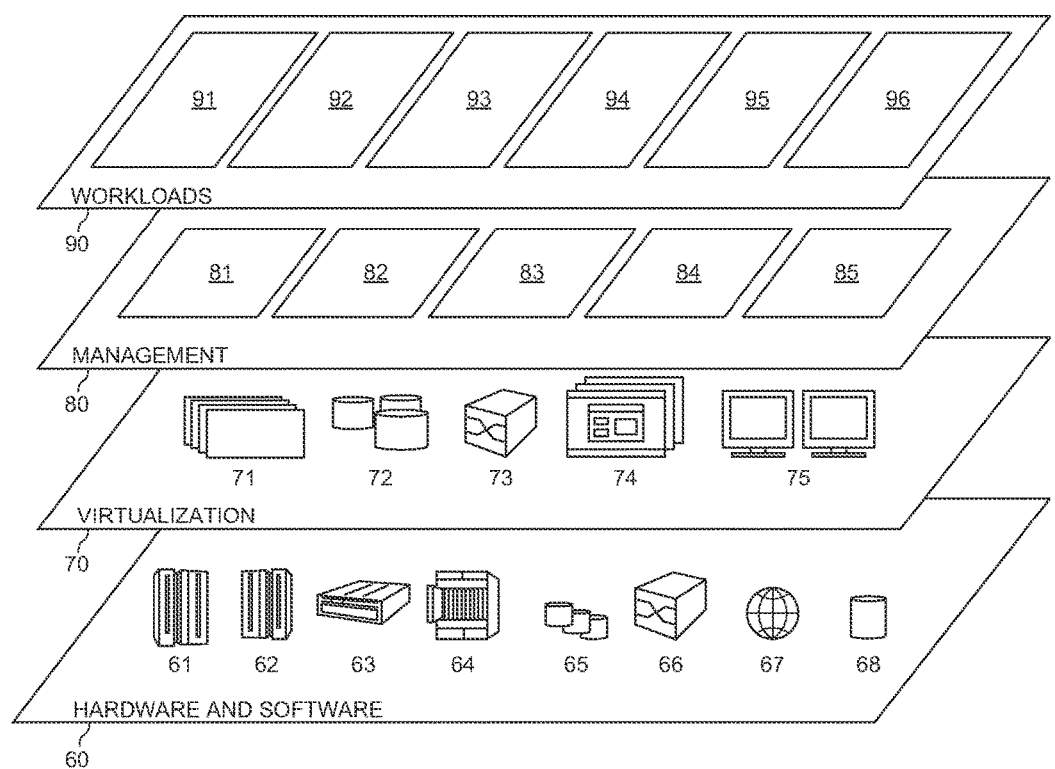
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 may include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Morphological Analysis 96. Morphological Analysis 96 may analyze the morphologies of microglial cells, especially after illness or traumatic injury.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium may include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are disclosed in the specification, these combinations are not intended to limit the disclosure of possible implementations. In fact, many of these features may be combined in ways not specifically disclosed in the specification. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for morphological analysis of neural cells, the method executed by one or more processors, the method comprising:
   receiving an immunohistochemistry (IHC) image of one or more neural cells;
   detecting the one or more neural cells in the IHC image using a first neural network, wherein the detecting includes identifying boundaries of the one or more neural cells, wherein the detecting the one or more neural cells comprises:
      identifying one or more signature features of a neural cell from a plurality of patches; and
      based on identifying the one or more signature features, generating a bounding box enclosing the neural cell;
   generating a segmentation cell mask using a second neural network based on the identified boundaries of the one or more neural cells, wherein the generating the segmentation cell mask comprises:
      receiving the bounding box enclosing the neural cell;
      extending the bounding box enclosing the neural cell to cover a cell body of the neural cell and to cover extending processes of the neural cell;
      receiving a cell location for the neural cell, the cell location including a unique identification associated with a patch from the plurality of patches where the extended bounding box is located and corresponding coordinates of the patch; and
      generating the segmentation cell mask based on the extended bounding box and the received cell location; and
   classifying the one or more neural cells based on the generated segmentation cell mask using a trained classification model.

2. The method of claim 1, further comprising:
   reconstructing a cell mapping based on cell location of the one or more neural cells, activation classes of the one or more neural cells, morphology of the one or more neural cells, and morphometric parameters of the one or more neural cells.

3. The method of claim 2, wherein the morphometric parameters includes at least one of pixel intensity, intensity ratio between soma and processes, or soma shape change parameters.

4. The method of claim 1, wherein the first neural network and the second neural network are trained on a same training data and rule-based ground truths.

5. The method of claim 1, wherein prior to the detecting the one or more neural cells in the IHC image, the IHC image is preprocessed, the preprocessing comprising:
   removing a background from the IHC image;
   converting the IHC image into a grayscale image, wherein the converting includes intensity inversion to reduce influence of color tones in the morphological analysis; and
   dividing the converted IHC image into a plurality of patches.

6. The method of claim 1, wherein the generating the segmentation cell mask further comprises:
   aligning the generated segmentation cell mask with the neural cell based on the cell location or the one or more signature features.

7. The method of claim 1, wherein the classifying comprises identifying activation classes for the one or more neural cells.

8. The method of claim 1, wherein the IHC image comprises a full brain image that includes the one or more neural cells.

9. The method of claim 1, wherein the one or more neural cells includes microglia, and wherein classifying the one or more neural cells includes classifying the one or more neural cells into a cell type, wherein the cell type is one of ramified, hypertrophic, bushy, ameboid, rod, or hyper-rod cell type.

10. The method of claim 1, wherein the one or more neural cells includes astroglia, and wherein classifying the one or more neural cells includes classifying the one or more neural cells into a cell type based on a localization of the one or more neural cells and a reactivity of the one or more neural cells.

11. An apparatus comprising:
    at least one memory configured to store program code; and
    at least one processor configured to read the program code and operate as instructed by the program code, the program code comprising:
       first receiving code configured to cause the at least one processor to receive an immunohistochemistry (IHC) image of one or more neural cells;
       first detecting code configured to cause the at least one processor to detect the one or more neural cells in the IHC image using a first neural network, wherein the detecting includes identifying boundaries of the one or more neural cells, wherein the first detecting code comprises:
  identifying code configured to cause the at least one processor to identify one or more signature features of a neural cell from a plurality of patches; and
  second generating code configured to cause the at least one processor to generate a bounding box enclosing the neural cell based on the one or more signature features;
first generating code configured to cause the at least one processor to generate a segmentation cell mask using a second neural network based on the identified boundaries of the one or more neural cells, wherein the first generating code comprises:
  second receiving code configured to cause the at least one processor to receive the bounding box enclosing the neural cell;
  first extending code configured to cause the at least one processor to extent the bounding box enclosing the neural cell to cover a cell body of the neural cell and to cover extending processes of the neural cell;
  third receiving code configured to cause the at least one processor to receive a cell location for the neural cell, the cell location including a unique identification associated with a patch from the plurality of patches where the extended bounding box is located and corresponding coordinates of the patch; and
  third generating code configured to cause the at least one processor to generate the segmentation cell mask based on the extended bounding box and the received cell location; and
first classifying code configured to cause the at least one processor to classify the one or more neural cells based on the generated segmentation cell mask using a trained classification model.

12. The apparatus of claim 11, wherein the program code further comprises:
  first reconstructing code configured to cause the at least one processor to reconstruct a cell mapping based on cell location of the one or more neural cells, activation classes of the one or more neural cells, morphology of the one or more neural cells, and morphometric parameters of the one or more neural cells.

13. The apparatus of claim 11, wherein prior to the first detecting code, the program code comprises first preprocessing code, wherein the first preprocessing code comprises:
  removing code configured to cause the at least one processor to remove a background from the IHC image;
  converting code configured to cause the at least one processor to convert the IHC image into a grayscale image, wherein the converting includes intensity inversion to reduce influence of color tones in the morphological analysis; and
  dividing code configured to cause the at least one processor to divide the converted IHC image into a plurality of patches.

14. The apparatus of claim 11, wherein the first generating code further comprises:
  aligning code configured to cause the at least one processor to align the generated segmentation cell mask with the neural cell based on the cell location of the one or more signature features.

15. The apparatus of claim 11, wherein the classifying comprises identifying activation classes for the one or more neural cells.

16. A non-transitory computer-readable medium storing instructions that, when executed by at least one processor, causes the at least one processor to:
  receive an immunohistochemistry (IHC) image of one or more neural cells;
  detect the one or more neural cells in the IHC image using a first neural network, wherein the detecting includes identifying boundaries of the one or more neural cells;
  generate a segmentation cell mask using a second neural network based on the identified boundaries of the one or more neural cells; and
  classify the one or more neural cells based on the generated segmentation cell mask using a trained classification model,
  wherein the detecting the one or more neural cells using the first neural network comprises:
    identifying one or more signature features of a neural cell from a plurality of patches;
    based on identifying the one or more signature features, generating a bounding box enclosing the neural cell, and
  wherein the generating the segmentation cell mask comprises:
    receiving the bounding box enclosing the neural cell;
    extending the bounding box enclosing the neural cell to cover a cell body of the neural cell and to cover extending processes of the neural cell;
    receiving a cell location for the neural cell, the cell location including a unique identification associated with a patch from the plurality of patches where the extended bounding box is located and corresponding coordinates of the patch; and
    generating the segmentation cell mask based on the extended bounding box and the received cell location.

* * * * *